United States Patent
Kurosaki et al.

(10) Patent No.: US 10,493,840 B2
(45) Date of Patent: Dec. 3, 2019

(54) POWER TRANSMISSION APPARATUS

(71) Applicants: TOYOTA JIDOSHA KABUSHIKI KAISHA, Toyota-shi, Aichi-ken (JP); MEANS INDUSTRIES, INC., Saginaw, MI (US)

(72) Inventors: Yuki Kurosaki, Susono (JP); Hiroyuki Shioiri, Yokohama (JP); Hiroyuki Shibata, Odawara (JP); Hiroki Yasui, Susono (JP); Joshua D. Hand, Midland, MI (US)

(73) Assignees: TOYOTA JIDOSHA KABUSHIKI KAISHA, Toyota-shi (JP); MEANS INDUSTRIES, INC., Saginaw, MI (US)

( * ) Notice: Subject to any disclaimer, the term of this patent is extended or adjusted under 35 U.S.C. 154(b) by 582 days.

(21) Appl. No.: 15/257,116

(22) Filed: Sep. 6, 2016

(65) Prior Publication Data

US 2017/0066317 A1 Mar. 9, 2017

(30) Foreign Application Priority Data

Sep. 8, 2015 (JP) .................................. 2015-176751

(51) Int. Cl.
*B60K 6/383* (2007.10)
*F16H 57/021* (2012.01)
(Continued)

(52) U.S. Cl.
CPC ................ *B60K 6/383* (2013.01); *B60K 6/46* (2013.01); *F16D 41/02* (2013.01); *F16D 41/125* (2013.01);
(Continued)

(58) Field of Classification Search
CPC ......... B60K 6/365; B60K 6/383; F16D 41/02; F16D 41/125; F16D 41/14;
(Continued)

(56) References Cited

U.S. PATENT DOCUMENTS 2,333,161 A 11/1943 Dunn
6,244,965 B1 6/2001 Klecker et al.
(Continued)

FOREIGN PATENT DOCUMENTS

CN 104589993 A 5/2015
JP 2015-077846 A 4/2015
(Continued)

OTHER PUBLICATIONS

United States Patent and Trademark Office, Non-Final Office Action issued to U.S. Appl. No. 15/248,204 dated May 2, 2017, 10 pages.
(Continued)

*Primary Examiner* — Richard M Lorence
(74) *Attorney, Agent, or Firm* — Hunton Andrews Kurth LLP

(57) ABSTRACT

A power transmission apparatus includes: an input shaft; a selectable one-way clutch; a housing case; a center support; a lubricating oil reservoir; and an oil passage. The oil passage extends through a pocket plate disposed between the lubricating oil reservoir and a selector plate. The selector plate includes a through-hole. The through-hole is located at a position where the through-hole is not lined up with the opening of the oil passage in a radial direction and a circumferential direction of the selector plate in a non-engagement state of the selectable one-way clutch, and also at a position where the through-hole is lined up with the opening of the oil passage in the radial direction and the circumferential direction of the selector plate in an engagement state of the selectable one-way clutch.

5 Claims, 11 Drawing Sheets

(51) Int. Cl.
    *F16H 57/04*   (2010.01)
    *F16H 3/72*    (2006.01)
    *B60K 6/46*    (2007.10)
    *F16D 41/12*   (2006.01)
    *F16D 41/02*   (2006.01)
    *F16D 41/14*   (2006.01)
    *B60K 6/365*   (2007.10)

(52) U.S. Cl.
    CPC ............ *F16D 41/14* (2013.01); *F16H 3/727* (2013.01); *F16H 57/021* (2013.01); *F16H 57/042* (2013.01); *F16H 57/045* (2013.01); *F16H 57/0424* (2013.01); *F16H 57/0436* (2013.01); *F16H 57/0473* (2013.01); *F16H 57/0483* (2013.01); *F16H 57/0484* (2013.01); *B60K 6/365* (2013.01); *B60Y 2200/92* (2013.01); *B60Y 2400/427* (2013.01); *F16D 2300/06* (2013.01); *F16H 3/724* (2013.01); *F16H 57/0434* (2013.01); *F16H 57/0476* (2013.01); *Y10S 903/913* (2013.01)

(58) Field of Classification Search
    CPC .... F16D 2300/06; F16H 3/724; F16H 57/021; F16H 57/042; F16H 57/0424; F16H 57/0434; F16H 57/0436; F16H 57/045; F16H 57/0473; F16H 57/0476; F16H 57/0483; F16H 57/0484; B60Y 2200/92; B60Y 2400/427; Y10S 903/913
    See application file for complete search history.

(56) References Cited

U.S. PATENT DOCUMENTS

| | | |
|---|---|---|
| 7,258,214 B2 | 8/2007 | Pawley et al. |
| 7,344,010 B2 | 3/2008 | Fetting, Jr. et al. |
| 7,484,605 B2 | 2/2009 | Pawley et al. |
| 8,051,959 B2 | 11/2011 | Eisengruber |
| 8,079,453 B2 | 12/2011 | Kimes |
| 8,272,488 B2 | 9/2012 | Eisengruber et al. |
| 8,602,187 B2 | 12/2013 | Prout |
| 8,844,693 B2 | 9/2014 | Pawley |
| 9,121,454 B2 | 9/2015 | Pawley |
| 9,188,170 B2 | 11/2015 | Prout et al. |
| 9,188,174 B2 | 11/2015 | Beiser et al. |
| 9,377,061 B2 | 6/2016 | Kimes et al. |
| 9,851,000 B2 * | 12/2017 | Shioiri ................. F16H 57/045 |
| 2009/0107769 A1 | 4/2009 | Sato et al. |
| 2010/0018795 A1 | 1/2010 | Samie et al. |
| 2010/0255954 A1 | 10/2010 | Samie et al. |
| 2013/0152570 A1 | 6/2013 | Hoshinoya et al. |
| 2014/0342868 A1 | 11/2014 | Igarashi et al. |
| 2015/0105205 A1 | 4/2015 | Kurosaki et al. |
| 2015/0211587 A1 | 7/2015 | Kimes et al. |
| 2016/0129864 A1 | 5/2016 | Essenmacher |
| 2016/0131205 A1 | 5/2016 | Essenmacher |
| 2016/0131206 A1 | 5/2016 | Essenmacher |
| 2016/0160941 A1 | 6/2016 | Green et al. |
| 2016/0223072 A1 * | 8/2016 | Miyake ............... F16H 57/0475 |
| 2016/0265605 A1 * | 9/2016 | Tomita ................. F16D 41/125 |
| 2017/0059033 A1 | 3/2017 | Shioiri et al. |

FOREIGN PATENT DOCUMENTS

| | | |
|---|---|---|
| JP | 2016037120 A | 3/2016 |
| JP | 2017-044298 A | 3/2017 |
| WO | 2015/056087 A1 | 4/2015 |

OTHER PUBLICATIONS

United States Patent and Trademark Office, Notice of Allowance issued to U.S. Appl. No. 15/248,204 dated Aug. 24, 2017, 8 pages.

* cited by examiner

POWER TRANSMISSION APPARATUS

INCORPORATION BY REFERENCE

The disclosure of Japanese Patent Application No. 2015-176751 filed on Sep. 8, 2015 including the specification, drawings and abstract is incorporated herein by reference in its entirety.

BACKGROUND OF THE INVENTION

1. Field of the Invention

Embodiments of the present invention relate to a power transmission apparatus.

2. Description of Related Art

There have been known hybrid vehicles (HV vehicles) equipped with engines and motors as driving power sources, and capable of carrying out the EV drive using only the motors while the engines are stopped. For example, Japanese Patent Application Publication No. 2015-77846 discloses a power transmission apparatus of a hybrid vehicle including a selectable one-way clutch (hereinafter, referred to as an SOWC) as a lock mechanism in a housing case (rear case). This power transmission apparatus supplies a lubricating oil into the SOWC by a mechanical oil pump driven by an engine power.

SUMMARY

A power transmission apparatus disclosed in JP 2015-77846 evenly supplies a lubricating oil to respective components in the housing case by the mechanical oil pump. Hence, it is impossible to intentionally control supply amount of the lubricating oil to a particular component, specifically, an SOWC. Consequently, depending on the operation condition of the SOWC, deficiency and excess of the lubricating oil occurs inside the SOWC, which might cause, e.g., an erroneous engagement or deterioration of duration life of the SOWC.

Embodiments of the present invention provide a power transmission apparatus capable of controlling supply amount of a lubricating oil supplied to an SOWC.

A power transmission apparatus for a vehicle according to one embodiment of the present invention is provided. The vehicle includes an engine and a motor as driving power sources. The vehicle is configured to be able to travel using only the motor as the driving power source with the engine stopped. The power transmission apparatus includes: an input shaft; a selectable one-way clutch; a housing case; a center support; a lubricating oil reservoir; and an oil passage. Power from the engine is inputted into the input shaft. The selectable one-way clutch includes a notch plate, a selector plate, and a pocket plate. The notch plate, the selector plate, and the pocket plate are arranged around the input shaft. The notch plate, the selector plate, and the pocket plate are adjacently arranged in an axial direction of the input shaft in an order from the notch plate, the selector plate, and the pocket plate. The selectable one-way clutch is configured such that switching between an engagement state of transmitting a torque between the pocket plate and the notch plate and a non-engagement state of transmitting no torque between the pocket plate and the notch plate is carried out by rotation of the selector plate. The selectable one-way clutch is configured to rotate the notch plate along with rotation of the motor. The housing case is configured to house the input shaft and the selectable one-way clutch inside the housing case. The center support is disposed between an inner surface of the housing case and the input shaft inside the housing case. The center support is configured to support the input shaft relative to the housing case. The lubricating oil reservoir is disposed in a lubrication passage of the lubricating oil inside the housing case. The oil passage is configured to supply the lubricating oil reserved in the lubricating oil reservoir into the selectable one-way clutch. The oil passage extends through the pocket plate disposed between the lubricating oil reservoir and the selector plate. The selector plate includes a through-hole. The through-hole is located at a position where the through-hole is not lined up with the opening of the oil passage in a radial direction and a circumferential direction of the selector plate in the non-engagement state of the selectable one-way clutch, and also at a position where the through-hole is lined up with the opening of the oil passage in the radial direction and the circumferential direction of the selector plate in the engagement state of the selectable one-way clutch.

According to the power transmission apparatus of this embodiment, it is possible to reserve the lubricating oil flowing through the inside of the housing case in the lubricating oil reservoir, and supply the reserved lubricating oil to the selectable one-way clutch through the oil passage. In the power transmission apparatus, the through-hole is not lined up with the opening of the oil passage in the non-engagement state of the selectable one-way clutch, thereby reducing the amount of the lubricating oil supplied from the lubricating oil reservoir to the selectable one-way clutch; and in the engagement state of the selectable one-way clutch, the through-hole is lined up and communicated with the opening of the oil passage, thereby increasing the oil amount of the lubricating oil supplied from the lubricating oil reservoir to the selectable one-way clutch.

In the power transmission apparatus according to the above embodiment, the lubricating oil reservoir may be disposed to a portion on the pocket plate in the axial direction of the input shaft, the portion located on an opposite side to the selector plate. In the power transmission apparatus according to the above embodiment, the notch plate, the selector plate, the pocket plate, and the center support may be adjacently arranged in the axial direction of the input shaft in an order from the notch plate, the selector plate, the pocket plate, and center support. The lubricating oil reservoir may be disposed to a portion on the center support in the axial direction of the input shaft. The portion may be located on an opposite side to the pocket plate. The oil passage may extend through the pocket plate and the center support disposed between the lubricating oil reservoir and the selector plate.

According to the power transmission apparatus of the above embodiment, it is possible to reserve the lubricating oil flowing through the inside of the housing case in the lubricating oil reservoir, and supply the reserved lubricating oil to the selectable one-way clutch through the oil passage. In the power transmission apparatus, the through-hole is not lined up with the opening of the oil passage in the non-engagement state of the selectable one-way clutch, thereby reducing the amount of the lubricating oil supplied from the lubricating oil reservoir to the selectable one-way clutch; and in the engagement state of the selectable one-way clutch, the through-hole is lined up and communicated with the opening of the oil passage, thereby increasing the oil amount of the lubricating oil supplied from the lubricating oil reservoir to the selectable one-way clutch.

In the power transmission apparatus according to the above embodiment, a sectional shape of the oil passage may be the same as a shape of the through-hole, and may be a circular shape.

According to the power transmission apparatus of this embodiment, each of the sectional shape of the oil passage and the shape of the through-hole is formed in a circular shape, thereby setting a minimum radius of curvature thereof to be the greatest among shapes having the same area; therefore, if the lubricating oil is supplied through the oil passage and the through-hole to the selectable one-way clutch, it is possible to suppress stress concentration onto an end of the oil passage, thus securing strength of the components through which the oil passage is formed.

In the power transmission apparatus according to the above embodiment, the through-hole may be located at an outer peripheral position of the selector plate. The oil passage may be located at a position corresponding to the through-hole in the radial direction of the selector plate. A sectional shape of the oil passage may be the same as a shape of the through-hole, and may be a laterally long elliptical shape of which shorter sides are arranged in the radial direction of the selector plate.

According to the power transmission apparatus of the above embodiment, the through-hole is formed in a laterally long elliptical shape, and is arranged at a position on the bottom side of the lubricating oil reservoir so as to be corresponding to the formation position of the through-hole, thereby lowering the oil surface level of the lubricating oil reserved in the lubricating oil reservoir, thus adjusting the amount of the lubricating oil in the lubricating oil reservoir.

In the power transmission apparatus according to the above embodiment, a sectional shape of the oil passage may be the same as a shape of the through-hole, and may be a rectangular shape of which longer sides are arranged in the radial direction of the selector plate.

According to the power transmission apparatus of this embodiment, each of the sectional shape of the oil passage and the shape of the through-hole is formed in a rectangular shape, thereby more rapidly increasing an overlapping area between the through-hole and the opening of the oil passage in the engagement state of the selectable one-way clutch at the beginning of the overlapping of the through-hole with the opening of the oil passage, compared with forming the sectional shape of the oil passage and the shape of the through-hole into another shape (such as a circular shape) with the same area, therefore, it is possible to allow more of the lubricating oil to flow in with a smaller overlapping range.

According to the power transmission apparatus of the above embodiment, by bringing the through-hole formed in the selector plate to be in communication with or out of communication with the oil passage, it is possible to control the supply amount of the lubricating oil supplied into the selectable one-way clutch.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
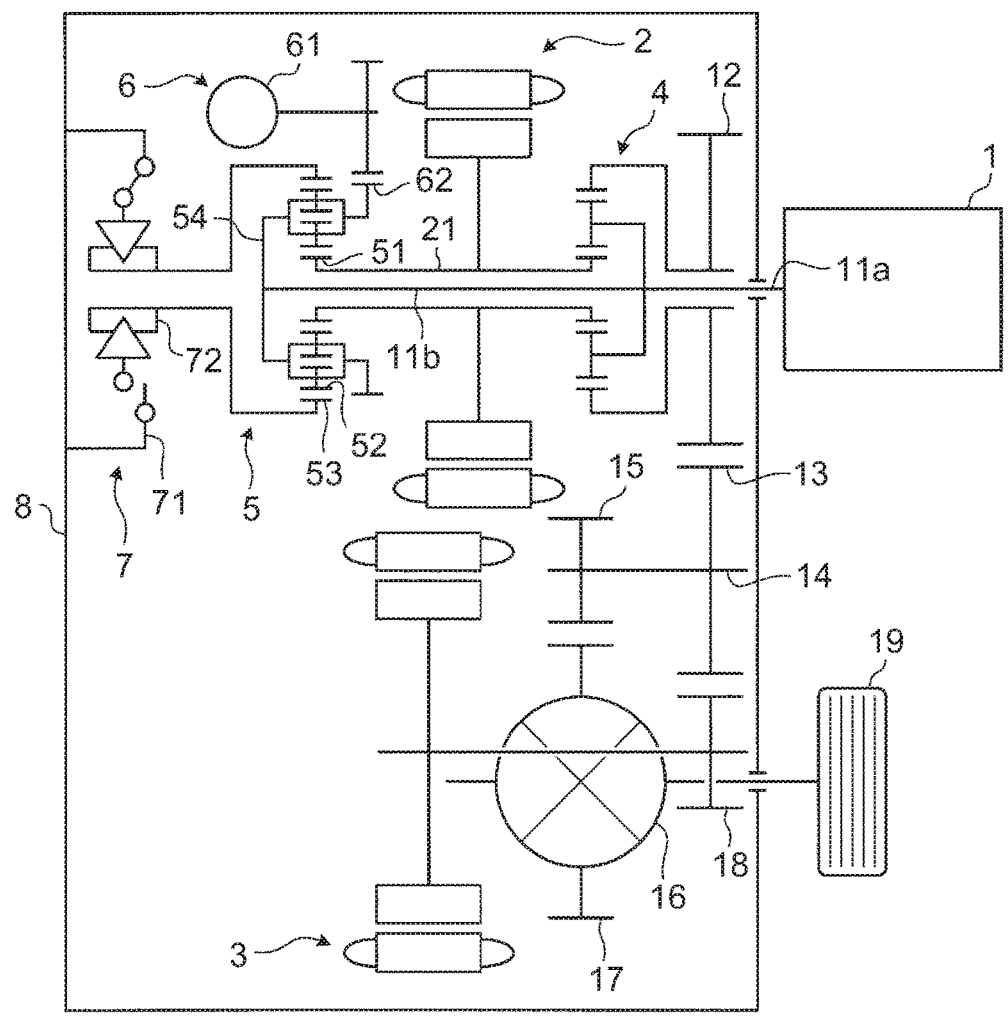
FIG. 1 is a skeleton view of a vehicle equipped with each power transmission apparatus according to first, second, and third embodiments of the present invention.
Figure 2:
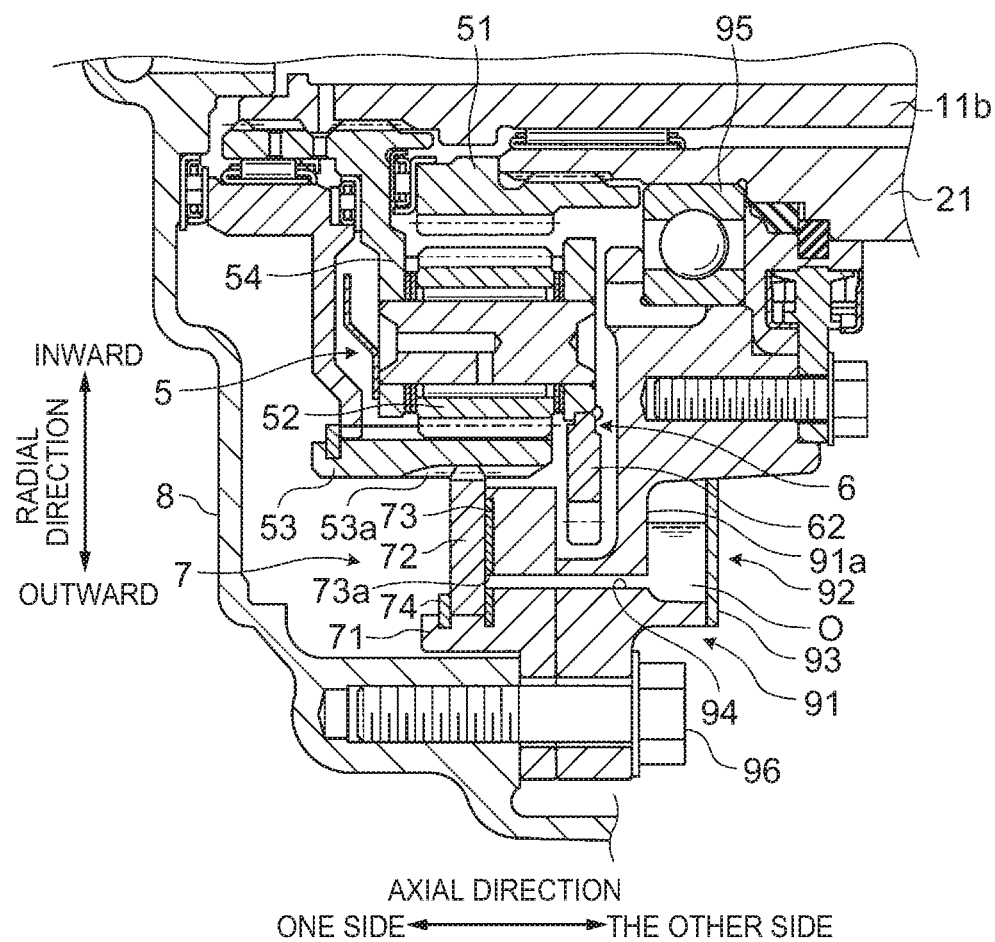
FIG. 2 is a sectional view showing a configuration of the power transmission apparatus according to the first embodiment of the present invention.
Figure 8A:
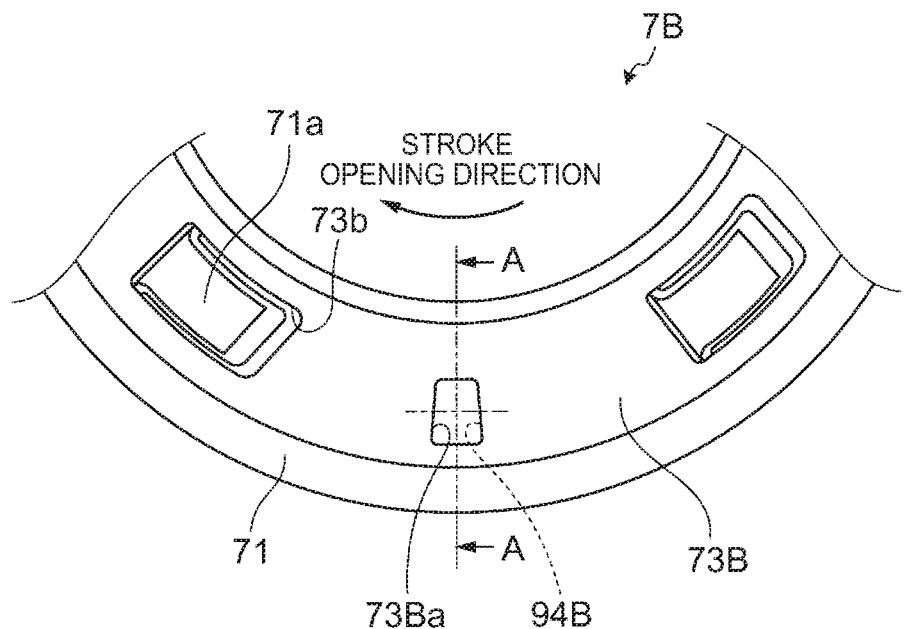
FIG. 8A is a view showing Embodiment Example 3 of the selectable one-way clutch of each power transmission apparatus according to the first, second, and third embodiments of the present invention, and a view showing respective components in the engagement state.
Figure 8B:
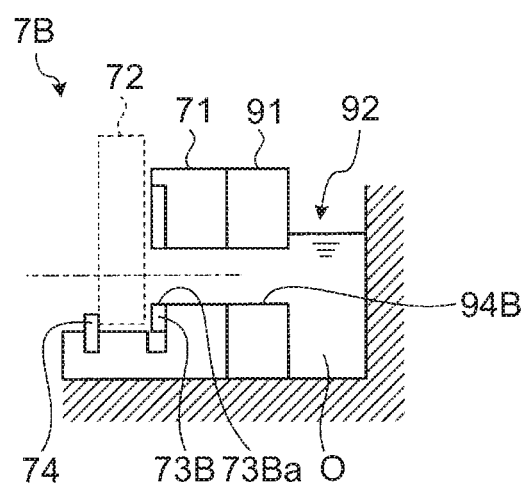
FIG. 8B is a sectional view taken along line A-A of FIG. 8A.
Figure 9:
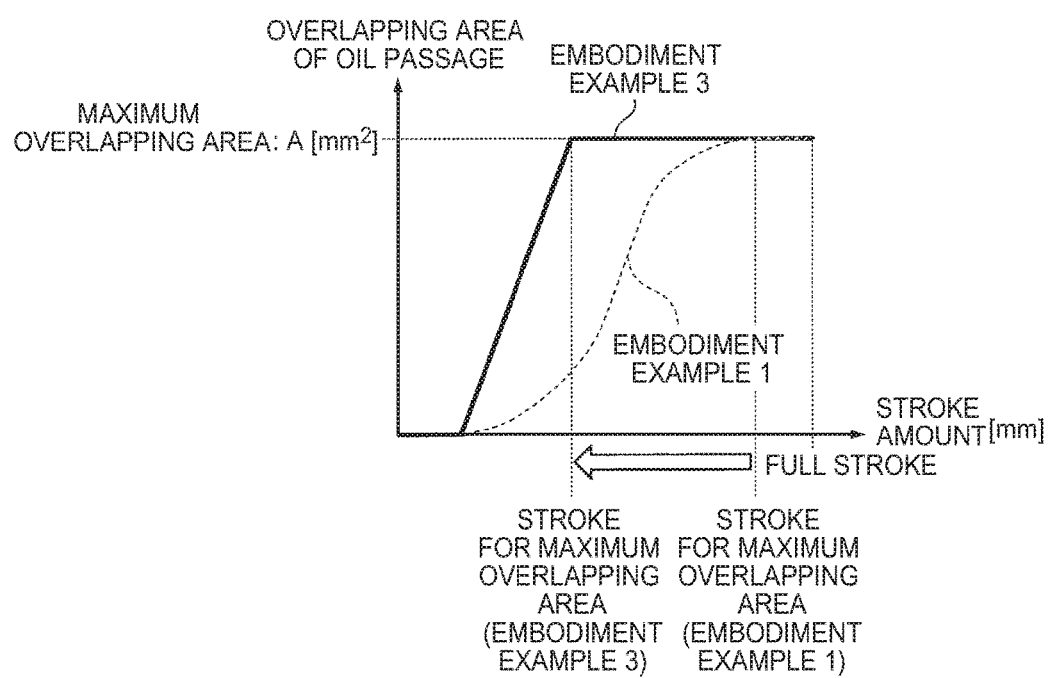
FIG. 9 is a graph showing each relation between an overlapping area with an oil passage and a stroke amount in the engagement state with respect to Embodiment Example 1 and Embodiment Example 3 of the selectable one-way clutch of each power transmission apparatus according to the first, second, and third embodiments of the present invention.
Figure 10:
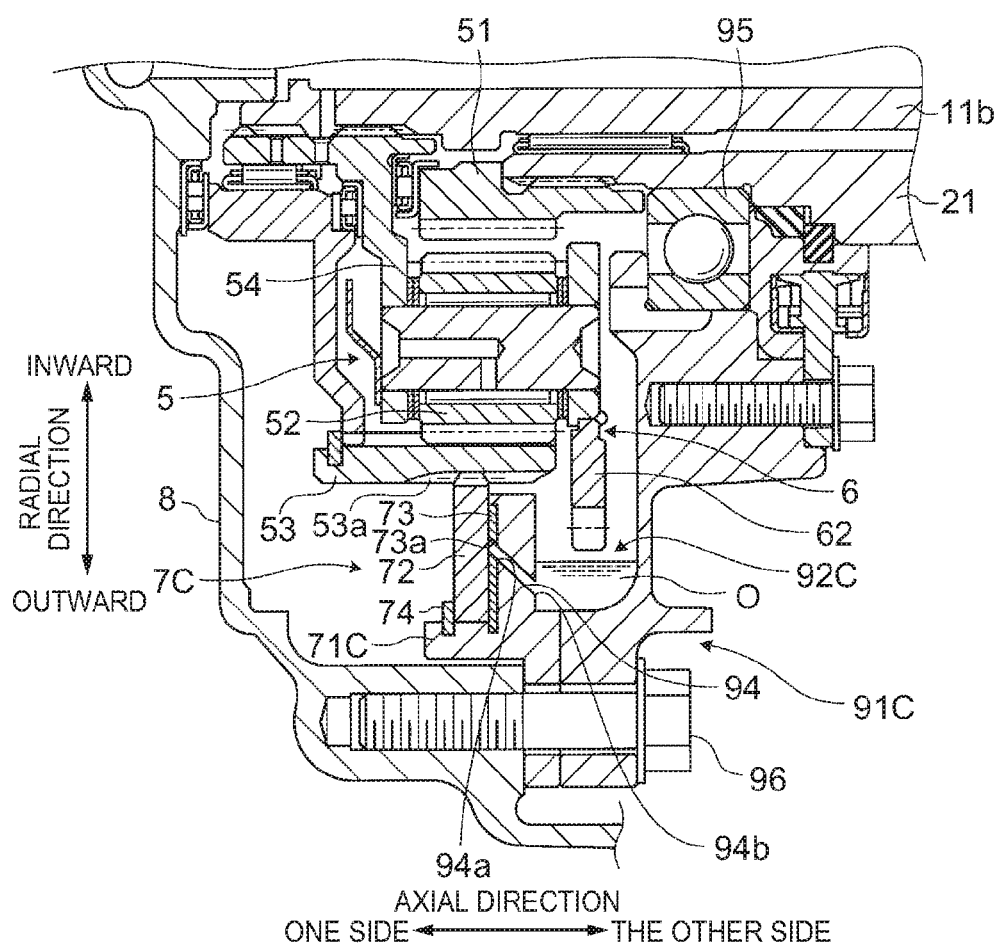
FIG. 10 is a sectional view showing a configuration of the power transmission apparatus according to the second embodiment of the present invention.
Figure 11:
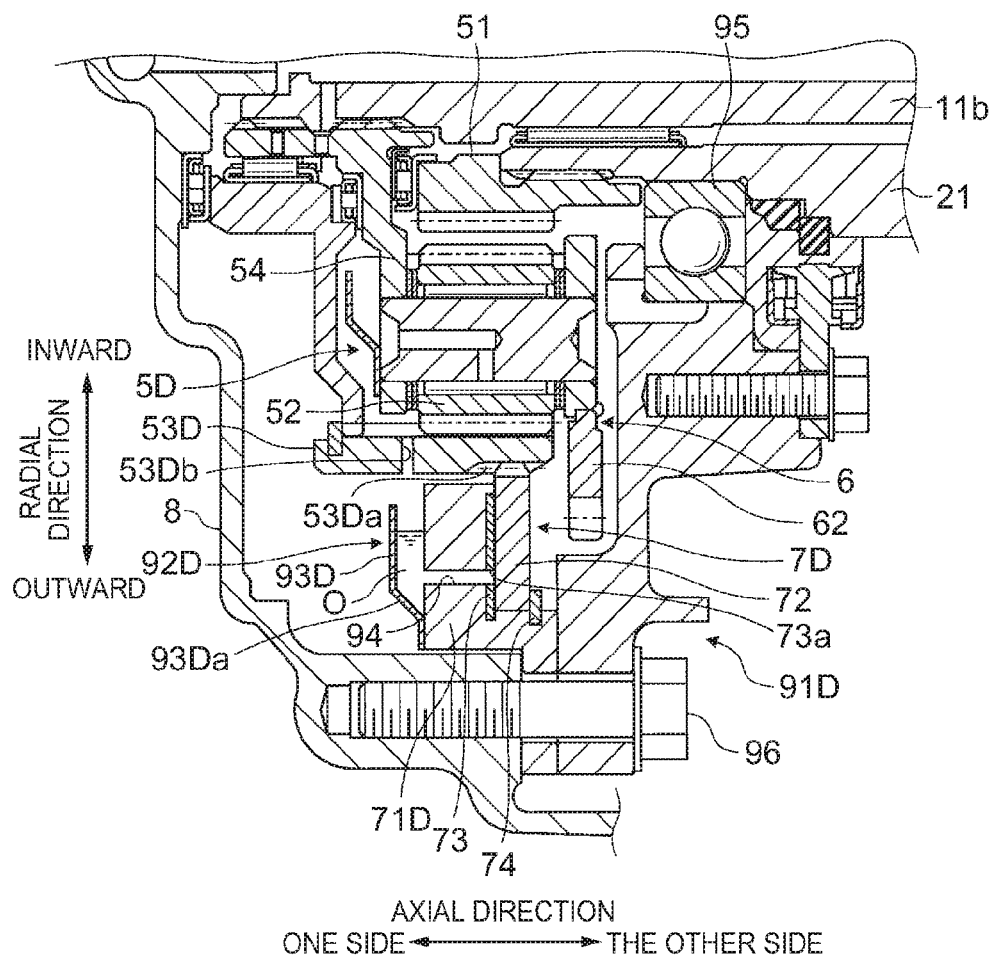
FIG. 11 is a sectional view showing the configuration of the power transmission apparatus according to the third embodiment of the present invention.

Each power transmission apparatus according to embodiments of the present invention will be described with reference to FIG. 1 to FIG. 11. Embodiments of the present invention are not limited to the embodiments described below. Components in the following embodiments include components that are easily replaceable by those skilled in the art or substantially the same components. FIG. 1 as referred to below is a skeleton view of an entire vehicle equipped with each power transmission apparatus, and FIG. 2, FIG. 10 and FIG. 11 are sectional views showing a part (lower half from an input shaft) of each power transmission apparatus.

[First embodiment] A vehicle equipped with a power transmission apparatus according to a first embodiment is a hybrid vehicle (HV vehicle) or a plug-in hybrid vehicle (PHV vehicle) including an engine and a motor as a driving power source, and more specifically, a split type (power split type) vehicle using an SOWC as a lock mechanism. The vehicle equipped with the power transmission apparatus according to the present embodiment includes an engine 1, a first rotary machine (motor) 2, a second rotary machine (motor) 3, a single pinion type planetary gear mechanism 4 that is a first differential mechanism, a double pinion type planetary gear mechanism 5 that is a second differential mechanism, an oil pump 6, an SOWC 7, a rear case 8 that is a housing case, and a center support 91 (see FIG. 2).

The vehicle equipped with the power transmission apparatus of the present embodiment includes: an input shaft 11b that is connected to an output shaft 11a of the engine 1 so as to receive power inputted from the engine 1; a rotor shaft 21 of the first rotary machine 2 that includes the input shaft 11b extending through an inside of the rotor shaft 21, and is relatively rotatable relative to the input shaft 11b; a drive gear 12; a counter driven gear 13; a counter shaft 14; a counter drive gear 15; a differential 16; a ring gear 17; a drive gear 18; and driven wheels 19.

The power transmission apparatus according to the present embodiment at least includes: the engine 1; the second rotary machine 3; the input shaft 11b; the oil pump 6; the SOWC 7; the rear case 8; and the center support 91. The power transmission apparatus according to the present embodiment has two drive modes: an HV drive mode in which the vehicle travels using only the engine 1, or the engine 1 and the second rotary machine 3 as a driving power source; and an EV drive mode in which the vehicle travels using only the second rotary machine 3 as the driving power source with the engine stopped.

The planetary gear mechanism 4 is a power split mechanism to split the power outputted from the engine 1 into the first rotary machine 2 side and each driven wheel 19 side (output side), and includes a sun gear, pinion gears, a ring gear, and a carrier (reference numerals thereof are not indicated in FIG. 1). In the planetary gear mechanism 4, the sun gear is connected to the rotor shaft 21 of the first rotary machine 2, and the ring gear is connected to the drive gear 12 that is an output element, and the carrier is connected to the output shaft 11a of the engine 1.

As shown in FIG. 1, the planetary gear mechanism 5 includes a sun gear 51, a pinion gear 52, a ring gear 53, and a carrier 54. In the planetary gear mechanism 5, the sun gear 51 is connected to the rotor shaft 21 of the first rotary machine 2, the pinion gear 52 is connected to an oil pump drive gear 62, the ring gear 53 is connected to a notch plate 72 of the SOWC 7 as described later, and the carrier 54 is connected to the output shaft 11a of the engine 1. Between the sun gear 51 and the ring gear 53, another pinion gear (a reference numeral thereof is not indicated in FIG. 1) other than the pinion gear 52 is provided, and the carrier 54 holds these pinion gears in a manner as to allow these pinion gears to rotate around their own axes as well as rotate around the sun gear. As shown in FIG. 2, in the rear case 8, the planetary gear mechanism 5 is disposed around the input shaft 11b, and between the input shaft 11b and the SOWC 7.

The oil pump 6 is a mechanical oil pump to supply a lubricating oil to respective components such as the SOWC 7 disposed inside the rear case 8. The oil pump 6 is driven by rotation of the input shaft 11b of the engine 1. As shown in FIG. 1 and FIG. 2, the oil pump 6 includes a pump body 61, and the oil pump drive gear 62 connected to the pump body 61 and the pinion gear 52.

The SOWC 7 restricts or permits rotation of a rotary element (the ring gear 53) of the planetary gear mechanism 5 so as to carry out switching between a THS mode and an OD lock mode, for example, in the HV drive mode. The THS mode is a mode in which a reaction force against the power of the engine 1 is generated by the first rotary machine 2 so as to drive the vehicle. The OD lock mode is a mode in which rotation of the carrier 54 of the planetary gear mechanism 5 is restricted so as to accelerate the rotation of the engine 1, and output this rotation to an output element (the drive gear 12) from the ring gear of the planetary gear mechanism 4.

As shown in FIG. 2, the SOWC 7 is disposed around the input shaft 11b, more specifically, on an outer periphery of the ring gear 53 of the planetary gear mechanism 5. The SOWC 7 includes a pocket plate 71 that is a stationary race, the notch plate 72 that is a rotary race, a selector plate 73 that is a switching member, and a snap ring 74 used for integrally assembling these components. The pocket plate 71, the notch plate 72, the selector plate 73, and the snap ring 74 are adjacently arranged in the axial direction of the input shaft 11b. Each of the pocket plate 71, the notch plate 72, the selector plate 73, and the snap ring 74 is generally formed in an annular shape around the axis of the input shaft 11b.

The aforementioned "axial direction" denotes a direction parallel with a direction in which the input shaft 11b extends, and a direction of a rotational axis of a rotary element (such as the planetary gear mechanism 5 and the SOWC 7) in the power transmission apparatus. A "radial direction" referred to in the following description denotes a direction orthogonal to the axial direction, and a radial direction of the rotary element in the power transmission apparatus.

Herein, although not shown in FIG. 2, plural pockets recessed in the axial direction of the input shaft 11b are formed in a surface of the pocket plate 71 that faces the selector plate 73, and struts (engagement pieces) 71a (see FIG. 3A and others) are installed thereinside. A coil spring (a reference numeral thereof is not indicated in the drawings) to push each strut 71a toward the selector plate 73 side is provided inside the pocket. At positions corresponding to the struts 71a, plural notches (engagement recesses) are formed in a surface of the notch plate 72 that faces the selector plate 73. At positions corresponding to the notches and struts 71a, window holes 73b (see FIG. 3A and others) are formed in the selector plate 73.

As the selector plate 73 rotates around the axis of the input shaft 11b, and if the window holes 73b coincide with the positions of the struts 71a, the struts 71a pushed by the above coil springs protrude through the window holes 73b toward the notch plate 72 side, and thus the struts 71a come into an engagement state of being in mesh with the notches of the notch plate 72. On the other hand, if the window holes 73b are out of position relative to the positions of the struts 71a, the struts 71a are pushed inside the pockets of the pocket plate 71 by portions having no window holes 73b of the selector plate 73, and thus the struts 71a come into a non-engagement state.

The above "engagement state" denotes a state in which the struts 71a of the pocket plate 71 are in mesh with the notches of the notch plate 72 so that a torque is transmitted between the pocket plate 71 and the notch plate 72. In this engagement state, the notch plate 72 is rotatable relative to the pocket plate 71 in one direction, but is not rotatable in the other direction.

On the other hand, the above "non-engagement state" denotes a state in which the struts 71a of the pocket plate 71 are out of mesh with the notches of the notch plate 72, so that no torque is transmitted between the pocket plate 71 and the notch plate 72. In this non-engagement state, the notch plate 72 becomes rotatable relative to the pocket plate 71 in the both directions.

As shown in FIG. 2, the rear case (housing case) 8 houses members, such as the input shaft 11b, the rotor shaft 21, the planetary gear mechanism 5, the oil pump 6, the SOWC 7, and the center support 91, thereinside.

The center support 91 supports the input shaft 11b and the rotor shaft 21. As shown in FIG. 2, in the rear case 8, the center support 91 is disposed between an inner surface of the rear case 8 and the input shaft 11b.

The center support 91, more specifically, a radially outer end of the center support 91 is fixed to the inner surface of the rear case 8 via a fastening member 96, a radially inner end of the center support 91 is fixed to the rotor shaft 21 via a bearing member 95. Through this, the center support 91 supports the rotor shaft 21 via the bearing member 95. The rotor shaft 21 is a hollow shaft, and the input shaft 11b is disposed inside the rotor shaft 21 via a bearing member (a reference numeral thereof is not indicated in FIG. 2). Accordingly, the center support 91 also supports the input shaft 11b via the bearing member 95, the rotor shaft 21, and the bearing member inside the rotor shaft 21. The center support 91 is generally formed in a disk shape around the axis of the input shaft 11b.

As shown in FIG. 1, the drive gear 12 is meshed with the counter driven gear 13. The counter shaft 14 is fixed to the counter driven gear 13, and the counter drive gear 15 having a smaller diameter than that of the counter driven gear 13 is fixed to the counter shaft 14. The counter drive gear 15 is meshed with the ring gear 17 of the differential 16 so as to output a driving torque from the differential 16 to the right and left driven wheels 19. The drive gear 18 is fixed to a rotor shaft (a reference numeral thereof is not indicated in FIG. 1) of the second rotary machine 3, and this drive gear 18 is meshed with the counter driven gear 13.

Herein, as aforementioned, in the power transmission apparatus of the related art, there is a problem that it is impossible to intentionally control only supply amount of the lubricating oil supplied to the SOWC, and more specifically, there are concerned the following three problems.

(Problem 1: Malfunction of the Selector Plate at the Start-Up of the Engine at Cold Time) For example, at cold time (at the lower-temperature time), viscosity of the lubricating oil inside the SOWC is higher, and the selector plate is drug by rotation of the notch plate at the start-up of the engine, which might cause malfunction (erroneous rotation) of the selector plate, thus resulting in erroneous engagement (fail) of the SOWC. Such dragging caused by the rotation of the notch plate results from influence of the lubricating oil O present between the notch plate and the selector plate. If it is possible to intentionally supply the lubricating oil O to an opposite side to the selector plate, that is, between the selector plate and the pocket plate, the influence of the lubricating oil O present between the notch plate and the selector plate can be reduced; but it is impossible for the power transmission apparatus of the related art to intentionally control only the oil amount of the lubricating oil supplied to the SOWC; therefore, the aforementioned problem cannot be solved by the power transmission apparatus of the related art.

(Problem 2: Control on the Ratchet Engagement Rotation Speed) For example, if the SOWC is in high differential rotation in a positive rotation direction, that is, if the notch plate rotates at a high speed in a direction where the struts come into mesh with the notches, if malfunction of the selector plate occurs because of some causes, so that the selector plate moves to the engagement position (e.g., at a position in FIG. 4A described later), an excessively great impact torque might be transmitted to the inside and the outside of the SOWC, thus causing damages and deterioration of life duration to the components. In order to prevent this, the SOWC is provided with a ratchet function to repel the struts by the notch plate at a predetermined differential rotation or more so that the struts do not come into mesh with the notches.

A differential rotation speed (ratchet engagement rotation speed) of the SOWC to activate the ratchet function is preferably set to be as low as a differential rotation speed required for the performance, but in order to attain this, it is required to supply a sufficient amount of the lubricating oil to the SOWC so as to attenuate the movement of the struts in high differential rotation. However, in the power transmission apparatus of the related art, it is impossible to intentionally control only the supply amount of the lubricating oil supplied to the SOWC; thus, the aforementioned problem cannot be solved by the power transmission apparatus of the related art. Even if it were possible to intentionally control only the supply amount of the lubricating oil supplied to the SOWC, there might be caused a contradiction that increase in supply amount of the lubricating oil results in deterioration of engagement reliability in the normal engagement (if the selector plate normally operating comes into engagement) while the SOWC is in low differential rotation. Hence, in order to solve the aforementioned problem, it is necessary to provide control on the oil amount by increasing or decreasing the supply amount of the lubricating oil depending on the operation condition (differential rotation speed) of the SOWC.

(Problem 3: Control on the Limit Overrun Rotation Speed) For example, while the SOWC is in high differential rotation in a negative rotation direction, that is, while the notch plate rotates at a high speed in a direction reverse to a direction in which the struts are in mesh with the notches, if malfunction of the selector plate occurs because of some causes, and the selector plate moves to the engagement position (e.g., the position of FIG. 4A), the struts repetitively collide against the notch plate or inner surfaces of the pockets housing the struts therein, which might cause damages or deterioration of duration life of the components.

The differential rotation speed (limit overrun rotation speed) of the SOWC including the above components that might be damaged is preferably set to be as high as a differential rotation speed required for the performance, but in order to attain this, it is required to supply a sufficient amount of the lubricating oil to the SOWC so as to attenuate movement of the struts in high differential rotation. However, in the power transmission apparatus of the related art, it is impossible to intentionally control only the supply amount of the lubricating oil to the SOWC; thus, the aforementioned problem cannot be solved by the power transmission apparatus of the related art. Even if it were possible to intentionally control only the supply amount of the lubricating oil to the SOWC, there might be caused a contradiction that increase in supply amount of the lubricating oil results in deterioration of engagement reliability in normal engagement of the SOWC in low differential rotation (if the selector plate normally operating comes into the engagement state). Hence, in order to solve the aforementioned problem, it is necessary to provide control on the oil amount by increasing or decreasing the supply amount of the lubricating oil depending on the operation condition (differential rotation speed) of the SOWC.

In order to solve the above three problems, the power transmission apparatus according to the present first embodiment, as shown in FIG. 2, is provided with the lubricating oil reservoir 92 to reserve the lubricating oil O in the vicinity of the SOWC 7 so as to supply the lubricating oil O from the lubricating oil reservoir 92 into the SOWC 7, and also control the supply amount of the lubricating oil O by the oil passage 94 used for supplying the lubricating oil O, and a through-hole 73a of the selector plate 73.

As shown in FIG. 2, in the power transmission apparatus according to the present embodiment, the notch plate 72, the selector plate 73, the pocket plate 71, and the center support 91 are adjacently arranged in this order from one side toward the other side in the axial direction of the input shaft 11b. The lubricating oil reservoir 92 is disposed in a lubrication passage of the lubricating oil O in the rear case 8, and also on the center support 91 side opposite to the pocket plate 71.

The lubricating oil O supplied from the oil pump 6 flows from an axial center (the input shaft 11b, the rotor shaft 21) in the radially outward direction via various paths; and the "lubrication passage of the lubricating oil O" including the lubricating oil reservoir 92 denotes a passage where the lubricating oil O flows in the order from the rotor shaft 21, the bearing member 95 to the center support 91. "The center support 91 side opposite to the pocket plate 71" denotes the other side in the axial direction of the input shaft 11b, as shown in FIG. 2.

As shown in FIG. 2, the lubricating oil reservoir 92 is configured to be provided at the downstream of the lubrication passage of the lubricating oil O, that is, radially outward so as to receive the lubricating oil O flowing radially outward by centrifugal force. The lubricating oil reservoir 92 is provided at a position close to the SOWC 7 both in the axial direction and in the radial direction of the input shaft 11b.

As shown in FIG. 2, the lubricating oil reservoir 92 is a region (space) partitioned by a surface of the center support 91 opposite to the pocket plate 71 and a shielding member 93 covering this surface. More specifically, a groove portion 91a is formed in the surface of the center support 91 opposite to the pocket plate 71, and a predetermined space is provided therein. The shielding member 93 in a platy shape is so fixed as to cover this groove portion 91a. The center support 91 is arranged around the input shaft 11b, and thus the groove portion 91a is formed in an annular shape with a predetermined depth.

In this manner, the power transmission apparatus is capable of reserving the lubricating oil O flowing through the inside of the rear case 8 with a simple structure. As shown in FIG. 2, the lubricating oil reservoir 92 is shielded by the shielding member 93, thus promoting enhancement of sealing performance thereof. Reservation amount of the lubricating oil O reserved in the lubricating oil reservoir 92 can be adjusted by changing the dimension (depth) of the groove portion 91a of the center support 91.

As shown in FIG. 2, an oil passage 94 is formed between the lubricating oil reservoir 92 and the SOWC 7. The oil passage 94 is so formed as to extend through the center support 91 and the pocket plate 71 arranged between the lubricating oil reservoir 92 and the notch plate 72. The oil passage 94 is configured in this manner, thereby enabling the lubricating oil O reserved in the lubricating oil reservoir 92 to be supplied into the SOWC 7, more specifically, between the pocket plate 71 and the selector plate 73, and between the selector plate 73 and the notch plate 72. In FIG. 2, the oil passage 94 is formed in a circular shape having a predetermined diameter at a predetermined position in the center support 91 and the pocket plate 71.

As shown in FIG. 2, the through-hole 73a is formed in the selector plate 73 in a manner as to extend through the selector plate 73 in the axial direction of the input shaft 11b. The through-hole 73a is used for adjusting the supply amount of the lubricating oil O from the lubricating oil reservoir 92 to the SOWC 7, and has a shape corresponding to the opening of the oil passage 94.

(Specific Configuration of the Through-Hole and the Oil Passage) Hereinafter, an example of a specific configuration of the through-hole and the oil passage applicable to the power transmission apparatus of the present embodiment will be described by using three embodiment examples. FIG. 3A, FIG. 4A, FIG. 5A, FIG. 6A, FIG. 7A, and FIG. 8A referred to as below are respective views of the SOWC 7 in FIG. 2 as viewed from the other side to one side in the axial direction of the input shaft 11b. Each "stroke opening direction" in these views denotes a rotation direction of the selector plate 73 as the state of the SOWC 7 shifts from the non-engagement state to the engagement state.

Figure 3A:
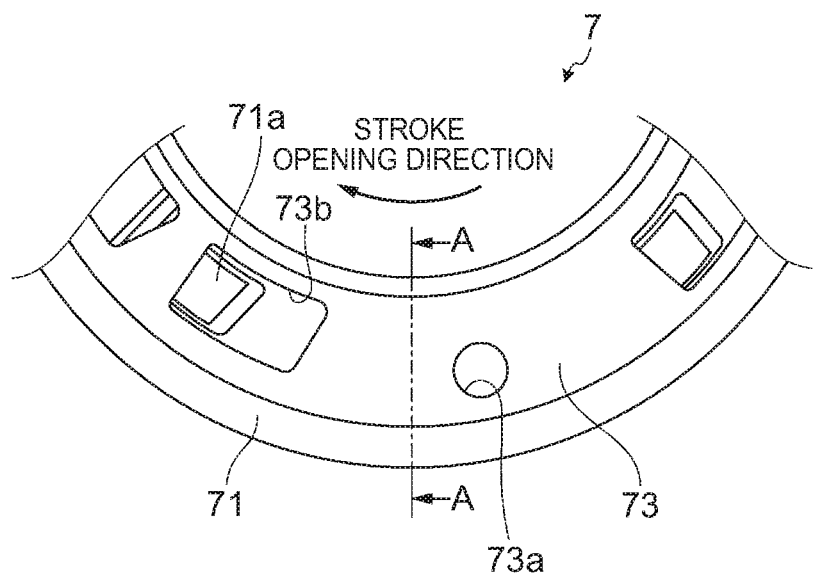
FIG. 3A is a view showing Embodiment Example 1 of a selectable one-way clutch of each power transmission apparatus according to the first, second, and third embodiments of the present invention, and a view showing respective components in a non-engagement state.
Figure 3B:
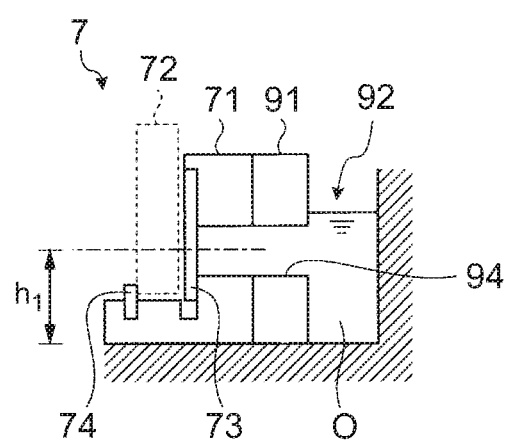
FIG. 3B is a sectional view taken along line A-A of FIG. 3A.

(Embodiment Example 1) As shown in FIG. 3A and FIG. 3B, the through-hole 73a according to Embodiment Example 1 is so formed as to extend through the selector plate 73 in the axial direction of the input shaft 11b, that is, in a thickness direction of the selector plate 73 (see FIG. 2). As shown in FIG. 3A and FIG. 3B, in the selector plate 73, the through-hole 73a is formed at a position where the through-hole 73a is not lined up with the opening of the oil passage 94 in the radial direction and the circumferential direction of the selector plate 73 in the non-engagement state of the SOWC 7, and the through-hole 73a is lined up with the opening of the oil passage 94 in the radial direction and the circumferential direction of the selector plate 73 in the engagement state of the SOWC 7. In other words, in the non-engagement state of the SOWC 7, the through-hole 73a is out of communication with the opening of the oil passage 94 in the axial direction of the input shaft 11b, and in the engagement state of the SOWC 7, the through-hole 73a is in communication with the opening of the oil passage 94 in the axial direction of the input shaft 11b.

Specifically, as shown in FIG. 3A and FIG. 3B, if each window hole 73b is out of position relative to each strut 71a, and if the SOWC 7 is in the non-engagement state, the through-hole 73a is not in the same phase as that of the opening of the oil passage 94 on the selector plate 73 side (at the same position in the circumferential direction of the selector plate 73), and is not at the same position as that of the opening of the oil passage 94 in the radial direction of the selector plate 73, so that the through-hole 73a is not lined up with this opening. Accordingly, the supply amount of the lubricating oil O from the lubricating oil reservoir 92 side toward the SOWC 7 side becomes decreased.

Although not shown in FIG. 3B, there is a fine gap between the pocket plate 71 and the selector plate 73 in which the lubricating oil O can be present, and an internal negative pressure is generated due to difference in rotation between the notch plate 72 and the pocket plate 71 inside the SOWC 7. Accordingly, as shown in FIG. 3A and FIG. 3B, even in the state in which the through-hole 73a is not lined up with the opening of the oil passage 94, at least amount of the lubricating oil O sufficient for preventing seizing of the SOWC 7 is supplied from the lubricating oil reservoir 92 side toward the SOWC 7 side.

Figure 4A:
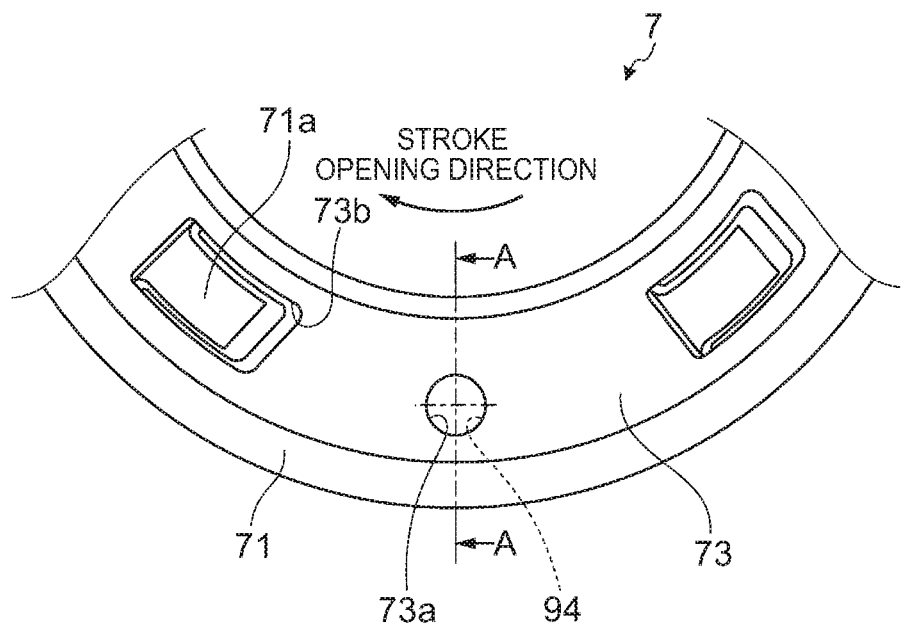
FIG. 4A is a view showing Embodiment Example 1 of the selectable one-way clutch of each power transmission apparatus according to the first, second, and third embodiments of the present invention, and a view showing respective components in the engagement state.
Figure 4B:
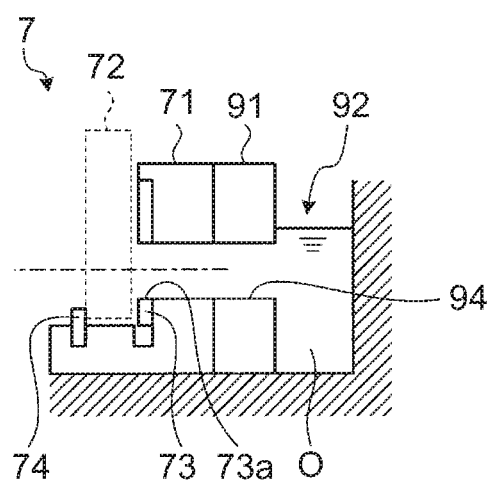
FIG. 4B is a sectional view taken along line A-A of FIG. 4A.

On the other hand, as shown in FIG. 4A and FIG. 4B, if the position of each window hole 73b coincides with the position of each strut 71a, and if the SOWC 7 is in the engagement state, the through-hole 73a is in the same phase as that of the opening of the oil passage 94 on the selector plate 73 side, and is at the same position as that of the opening of the oil passage 94 in the radial direction of the selector plate 73, so that the through-hole 73a is lined up with this opening. Accordingly, the supply amount of the lubricating oil O from the lubricating oil reservoir 92 side toward the SOWC 7 side becomes increased.

As shown in FIG. 4A, the through-hole 73a is formed in a circular shape. In FIG. 4A, the oil passage 94 also has a circular sectional shape corresponding to the shape of the through-hole 73a. As shown in FIG. 4B, the oil passage 94 is formed at a position corresponding to the position of the through-hole 73a in the radial direction of the selector plate 73, that is, at a position where the oil passage 94 communicates with the through-hole 73a in the engagement of the SOWC 7.

In this manner, each of the sectional shape of the oil passage 94 and the shape of the through-hole 73a is formed in a circular shape, thereby setting a minimum radius of curvature thereof to be the greatest among various shapes with the same area. Hence, if the lubricating oil O is supplied through the oil passage 94 and the through-hole 73a to the SOWC 7, it is possible to suppress stress concentration onto an end of the oil passage 94, thus securing strength of the components (the pocket plate 71 and the center support 91) through which the oil passage is formed.

Figure 5A:
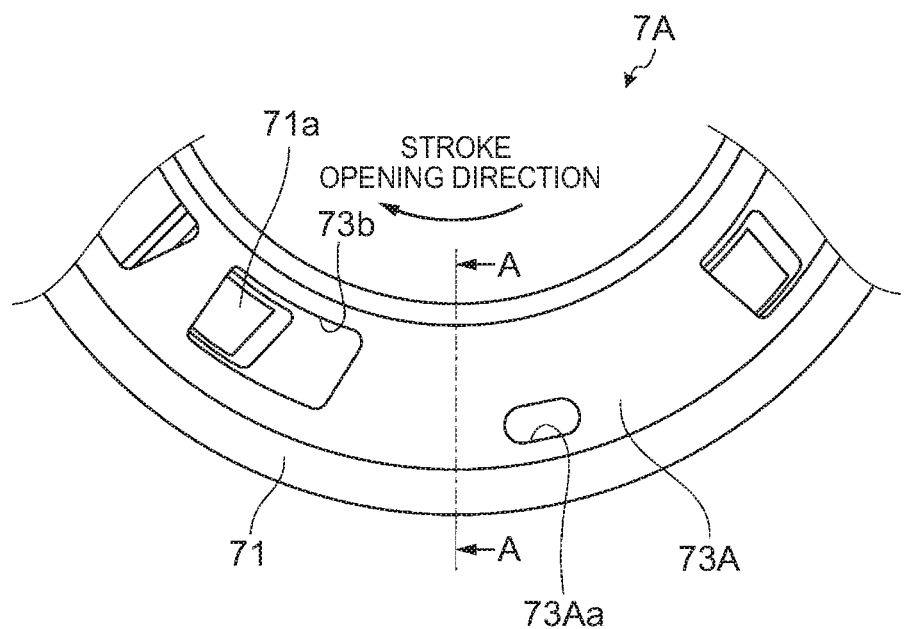
FIG. 5A is a view showing Embodiment Example 2 of the selectable one-way clutch of each power transmission apparatus according to the first, second, and third embodiments of the present invention, and a view showing respective components in the non-engagement state.
Figure 5B:
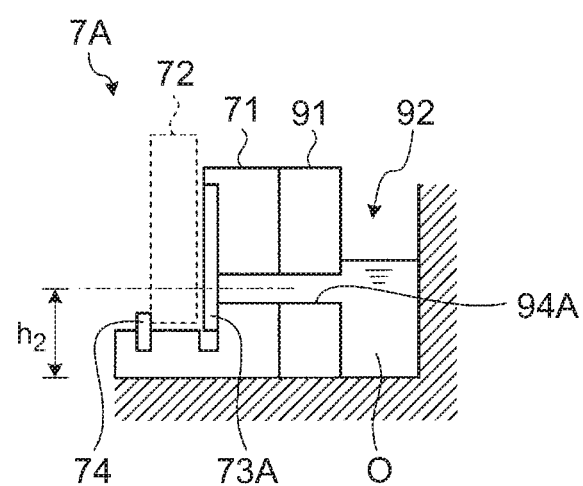
FIG. 5B is a sectional view taken along line A-A of FIG. 5A.
Figure 6A:
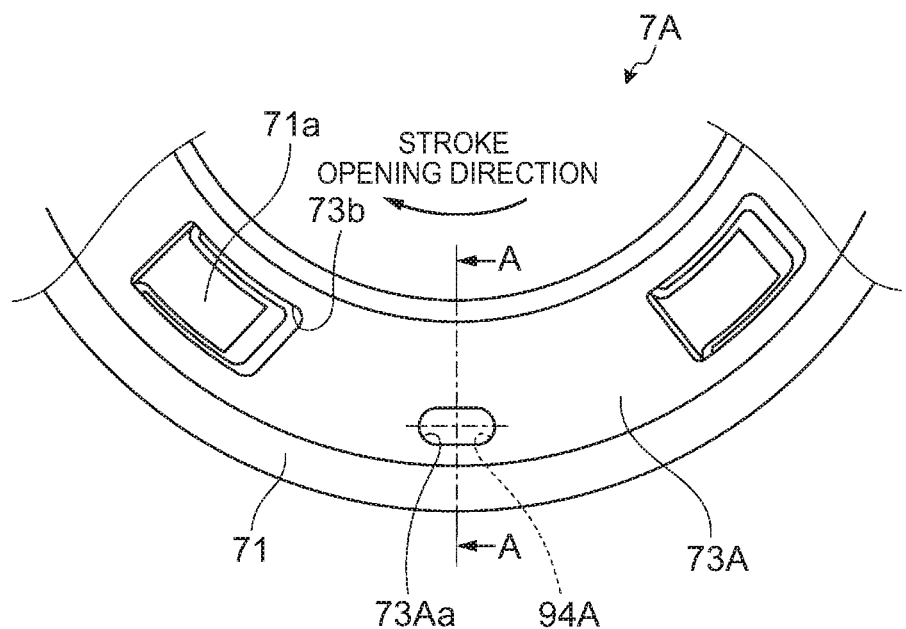
FIG. 6A is a view showing Embodiment Example 2 of the selectable one-way clutch of each power transmission apparatus according to the first, second, and third embodiments of the present invention, and a view showing respective components in the engagement state.
Figure 6B:
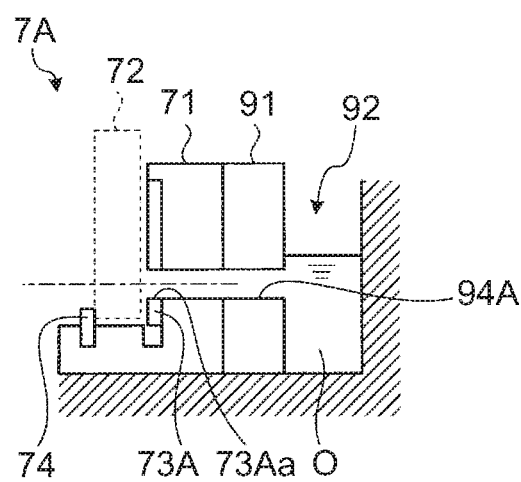
FIG. 6B is a sectional view taken along line A-A of FIG. 6A.

(Embodiment Example 2) A through-hole 73Aa according to Embodiment Example 2 has the same function and the same area as those of the through-hole 73a according to Embodiment Example 1, but has a difference in shape from Embodiment Example 1. As shown in FIG. 5A and FIG. 5B, in the non-engagement state of an SOWC 7A, the through-hole 73Aa is not lined up with an opening of an oil passage 94A, and thus the supply amount of the lubricating oil O from the lubricating oil reservoir 92 side toward the SOWC 7A side becomes decreased. As shown in FIG. 6A and FIG. 6B, in the engagement state of the SOWC 7A, the through-hole 73Aa is lined up with the opening of the oil passage 94A, and thus the supply amount of the lubricating oil O from the lubricating oil reservoir 92 side toward the SOWC 7A side becomes increased.

As shown in FIG. 5A, the through-hole 73Aa is formed at an outer peripheral position in a selector plate 73A, that is, a position in the selector plate 73A on a bottom side of the lubricating oil reservoir 92. The through-hole 73Aa is formed in a laterally long elliptical shape of which shorter sides are arranged in the radial direction of the selector plate 73A. In FIG. 5A, the sectional shape of the oil passage 94A is also formed in a laterally long elliptical shape corresponding to the shape of the through-hole 73Aa. As shown in FIG. 6B, the oil passage 94A is formed at a position corresponding to the through-hole 73Aa in the radial direction of the selector plate 73A, that is, at a position where the oil passage 94A communicates with the through-hole 73Aa in the engagement state of the SOWC 7A.

In this manner, the through-hole 73Aa is formed in a laterally long elliptical shape, and the oil passage 94A is arranged at a radially outward position corresponding to the formation position of the through-hole 73Aa, that is, at a position on the bottom side of the lubricating oil reservoir 92, thereby lowering the oil surface level of the lubricating oil O reserved in the lubricating oil reservoir 92, thus adjusting the amount of the lubricating oil O in the lubricating oil reservoir 92.

Specifically, the shape of the through-hole 73Aa is formed in a laterally long elliptical shape, and the sectional shape of the oil passage 94A is formed to be corresponding to this elliptical shape, and thus as shown in FIG. 5B, a height $h_2$ of the oil passage 94A is lower than a height $h_1$ of the oil passage 94 according to Embodiment Example 1 (see FIG. 3B); accordingly, the amount of the lubricating oil O required to be reserved in the lubricating oil reservoir 92 in order to set the oil surface to be higher than the oil passage 94A becomes smaller. Compared with Embodiment Example 1 (see FIG. 3B), it is possible to reduce the amount of the lubricating oil O required to be reserved in the lubricating oil reservoir 92, thus enhancing flexibility in designing of the lubricating oil reservoir 92. The aforementioned "height $h_1$, $h_2$ of the oil passage 94, 94A" denotes a height from the bottom surface of the oil passage 94, 94A to the center of the oil passage 94, 94A.

Figure 7A:
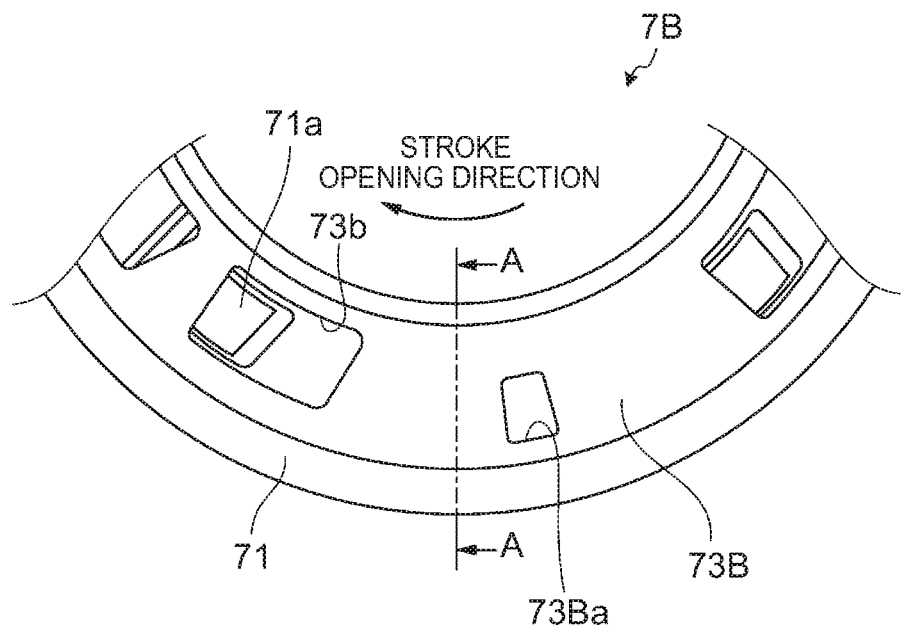
FIG. 7A is a view showing Embodiment Example 3 of the selectable one-way clutch of each power transmission apparatus according to the first, second, and third embodiments of the present invention, and a view showing respective components in the non-engagement state.
Figure 7B:
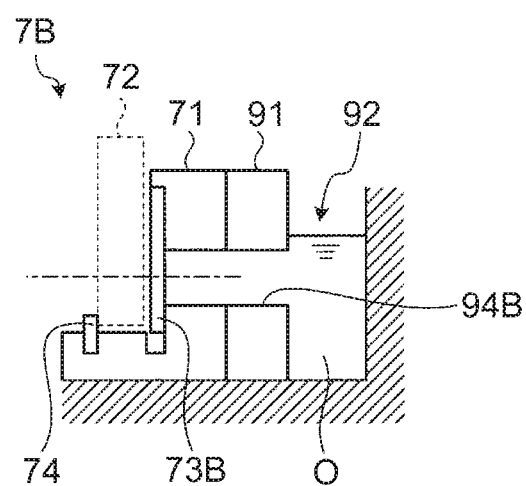
FIG. 7B is a sectional view taken along line A-A of FIG. 7A.

(Embodiment Example 3) A through-hole 73Ba according to Embodiment Example 3 has the same function and the same area as those of the through-holes 73a and 73Aa according to Embodiment Examples 1 and 2, but has a difference in shape from Embodiment Examples 1 and 2. As shown in FIG. 7A and FIG. 7B, in the non-engagement state of an SOWC 7B, the through-hole 73Ba is not lined up with an opening of an oil passage 94B, and thus the supply amount of the lubricating oil O from the lubricating oil reservoir 92 side toward the SOWC 7B side becomes decreased. As shown in FIG. 8A and FIG. 8B, in the engagement state of the SOWC 7B, the through-hole 73Ba is lined up with the opening of the oil passage 94B, and thus the supply amount of the lubricating oil O from the lubricating oil reservoir 92 side toward the SOWC 7B side becomes increased.

As shown in FIG. 7A, the through-hole 73Ba is formed in a rectangular, or preferably a trapezoid shape of which longer sides are arranged in the radial direction of the selector plate 73B, and which has slightly round corners. The "trapezoid shape" denotes a shape of which two sides facing each other in the radial direction of the selector plate 73B are parallel with each other, and of which two sides facing each other are configured such that one side radially outward of the selector plate 73B is longer than the other side radially inward thereof. In FIG. 7A, the sectional shape of the oil passage 94B is formed in a rectangular shape corresponding to the shape of the through-hole 73Ba. As shown in FIG. 8B, the oil passage 94B is formed at a position corresponding to the through-hole 73Ba in the radial direction of the selector plate 73B, that is, at a position where the oil passage 94B communicates with the through-hole 73Ba in the engagement state of the SOWC 7B.

Each of the sectional shape of the oil passage 94B and the shape of the through-hole 73Ba is formed in a rectangular shape (preferably a trapezoid shape), thereby more rapidly increasing an overlapping area between the through-hole 73Ba and the opening of the oil passage 94B at the beginning of the overlapping of the through-hole 73Ba with the opening of the oil passage 94B in the engagement state of the SOWC 7B, compared with forming each of the sectional shape of the oil passage 94B and the shape of the through-hole 73Ba into another shape (such as a circular shape) with the same area, therefore, it is possible to allow more of the lubricating oil O to flow in with a smaller overlapping range.

For example, as shown in FIG. 3B and FIG. 7B, assuming that the oil surface level (oil amount) in the lubricating oil reservoir 92 is the same both in Embodiment Example 1 and Embodiment Example 3, an overlapping area of the through-hole 73a with the oil passage 94 relative to a stroke amount of the selector plate 73 is different from an overlapping area of the through-hole 73Ba with the oil passage 94B relative to a stroke amount of the selector plate 73B. Herein, the "stroke amount" denotes a rotation rate (movement amount) of the selector plate 73, 73B while the state of the SOWC 7, 7B shifts from the non-engagement state to the engagement state. The "maximum overlapping area" in FIG. 9 denotes an overlapping area of the through-hole 73a, 73Ba with the opening of each oil passage 94, 94B at a moment when a sufficient amount of the lubricating oil O is supplied from the lubricating oil reservoir 92 to the SOWC 7, 7B side; and the "full stroke" denotes a rotation rate of the selector plate 73, 73B at a moment when each through-hole 73a, 73Ba is completely lined up with the opening of the oil passage 94, 94B.

Compared with Embodiment Example 1 in which the through-hole 73a (in a circular shape) is lined up with the opening (in a circular shape) of the oil passage 94, in Embodiment Example 3 including the through-hole 73Ba and the corresponding oil passage 94B, the through-hole 73Ba (in a rectangular shape) is lined up with the opening (in a rectangular shape) of the oil passage 94B in the engagement state of the SOWC 7B; thus the overlapping area at the same timing (with the same stroke amount) becomes greater than that of Embodiment Example 1. Accordingly, as shown in FIG. 9, in Embodiment Example 3, the overlapping area becomes the greatest with a smaller stroke than that of Embodiment Example 1. Accordingly, in Embodiment Example 3, it is possible to supply a sufficient amount of the lubricating oil O from the lubricating oil reservoir 92 toward the SOWC 7B side even at a moment when the selector plate 73B slightly rotates.

In Embodiment Example 3, each of the sectional shape of the oil passage 94B and the through-hole 73Ba is formed to have round corners, thereby suppressing stress concentration onto the end of the oil passage 94B as the lubricating oil O is supplied to the SOWC 7B through the oil passage 94B and the through-hole 73Ba, thus securing strength of the members (the pocket plate 71 and the center support 91) through which the oil passage 94B is formed.

The power transmission apparatus having the aforementioned configuration is capable of reserving the lubricating oil O flowing through the inside of the rear case 8 in the lubricating oil reservoir 92, and supplying the reserved lubricating oil O to each SOWC 7, 7A, 7B through each oil passage 94, 94A, 94B. The power transmission apparatus includes each through-hole 73a, 73Aa, 73Ba and each corresponding oil passage 94, 94A, 94B, and thus the through-hole 73a, 73Aa, 73Ba is not lined up with the opening of the oil passage 94, 94A, 94B in the non-engagement state of the SOWC 7, 7A, 7B, thereby reducing the amount of the lubricating oil O supplied from the lubricating oil reservoir 92 to the SOWC 7, 7A, 7B. On the other hand, in the engagement of the SOWC 7, 7A, 7B, the through-hole 73a, 73Aa, 73Ba is lined up and communicated with the opening of the oil passage 94, 94A, 94B, thereby increasing the oil amount of the lubricating oil O supplied from the lubricating oil reservoir 92 to the SOWC 7, 7A, 7B. Specifically, there is formed the through-hole 73a, 73Aa, 73Ba corresponding to the oil passage 94, 94A, 94B is formed at a predetermined position in the selector plate 73, 73A, 73B that carries out switching between the engagement and non-engagement of the SOWC 7, 7A, 7B so as to bring the through-hole 73a, 73Aa, 73Ba to be in communication or out of communication with the oil passage 94, 94A, 94B, thereby controlling the oil amount of the lubricating oil O supplied from the lubricating oil reservoir 92.

With respect to the aforementioned Problem 1 (malfunction of the selector plate at the start-up of the engine at cold time), in the power transmission apparatus according to the present first embodiment, it is possible to supply the lubricating oil O between the selector plate 73, 73A, 73B and the pocket plate 71 regardless of the engagement state and the non-engagement state of the SOWC 7, 7A, 7B. Through this, it is possible to reduce influence of the lubricating oil O present between the notch plate 72 and the selector plate 73, 73A, 73B, thereby suppressing dragging of the selector plate 73, 73A, 73B by the notch plate 72.

With respect to the aforementioned Problem 2 (control on the ratchet engagement rotation speed), in the power transmission apparatus according to the present embodiment, if the selector plate 73, 73A, 73B comes to the engagement position due to malfunction during a high differential rotation (positive rotation) of the SOWC 7, 7A, 7B, as shown in FIG. 4B, FIG. 6B, and FIG. 8B, the through-hole 73a, 73Aa, 73Ba of the selector plate 73, 73A, 73B is lined up with the opening of the oil passage 94, 94A, 94B. Accordingly, a sufficient amount of the lubricating oil O is supplied from the lubricating oil reservoir 92 into the SOWC 7, 7A, 7B by the internal negative pressure generated by the differential rotation of the SOWC 7, 7A, 7B, thus bringing the ratchet engagement rotation speed to be lower. Since the internal negative pressure is higher during the high differential rotation of the SOWC 7, 7A, 7B, it is possible to supply more of the lubricating oil O into the SOWC 7, 7A, 7B than that during the low differential rotation of the SOWC 7, 7A, 7B.

Because the internal negative pressure is relatively lower during the low differential rotation of the SOWC 7, 7A, 7B, the amount of the lubricating oil O supplied from the lubricating oil reservoir 92 to the SOWC 7, 7A, 7B becomes smaller even if the selector plate 73, 73A, 73B comes to the engagement position due to malfunction. Accordingly, if the SOWC 7, 7A, 7B comes into the engagement state during the low differential rotation thereof, it is possible to suppress an excessive supply of the lubricating oil O, and prevent deterioration of the engagement reliability.

With respect to the aforementioned Problem 3 (control on the limit overrun rotation speed), in the power transmission apparatus according to the present embodiment, if the selector plate 73, 73A, 73B comes to the engagement position due to malfunction during the high differential rotation (negative rotation) of the SOWC 7, 7A, 7B, as shown in FIG. 4B, FIG. 6B, and FIG. 8B, the through-hole 73a, 73Aa, 73Ba of the selector plate 73, 73A, 73B is lined up with the oil passage 94, 94A, 94B. Accordingly, a sufficient amount of the lubricating oil O is supplied from the lubricating oil reservoir 92 into the SOWC 7, 7A, 7B by the internal negative pressure generated by the differential rotation of the SOWC 7, 7A, 7B, thereby increasing the limit overrun rotation speed. Since the internal negative pressure is higher during the high differential rotation of the SOWC 7, 7A, 7B, it is possible to supply more of the lubricating oil O into the SOWC 7, 7A, 7B than that during the low differential rotation of the SOWC 7, 7A, 7B.

As with Problem 2, because the internal negative pressure is relatively lower during the low differential rotation of the SOWC 7, 7A, 7B, the amount of the lubricating oil O supplied from the lubricating oil reservoir 92 to the SOWC 7, 7A, 7B becomes smaller even if the selector plate 73, 73A, 73B comes to the engagement position due to malfunction. Accordingly, if the SOWC 7, 7A, 7B comes into the engagement state during the low differential rotation thereof, it is possible to suppress an excessive supply of the lubricating oil O, and prevent deterioration of the engagement reliability.

In this manner, in the power transmission apparatus according to the present embodiment, "during the high differential rotation of the SOWC 7, 7A, 7B and at a time of malfunction of the selector plate 73, 73A, 73B" in which more amount of the lubricating oil O is required to be supplied into the SOWC 7, 7A, 7B, it is possible to increase the amount of the lubricating oil O supplied from the lubricating oil reservoir 92 to the SOWC 7, 7A, 7B, and "during the low differential rotation of the SOWC 7, 7A, 7B and in the normal operation of the selector plate 73, 73A, 73B" in which amount of the lubricating oil O in the SOWC 7, 7A, 7B is required to be reduced, it is possible to reduce the amount of the lubricating oil O supplied from the lubricating oil reservoir 92 to the SOWC 7, 7A, 7B. At "the start-up of the engine at cold time", it is possible to supply the lubricating oil O between the selector plate 73, 73A, 73B and the pocket plate 71 regardless of the engagement state and the non-engagement state of the SOWC 7, 7A, 7B. Accordingly, it is possible to control the supply amount of the lubricating oil O supplied into the SOWC 7, 7A, 7B.

The power transmission apparatus according to the present embodiment is capable of solving insufficiency of the lubricating oil during the EV drive in addition to the aforementioned Problems 1 to 3. Specifically, in the power transmission apparatus of the related art, during the EV drive, the mechanical oil pump is stopped along with the stop of the engine, and thus it is impossible to sufficiently supply the lubricating oil to the SOWC, and thus seizing might be caused to the SOWC if the supplied lubricating oil amount is excessively small.

To the contrary, according to the power transmission apparatus of the present embodiment, during the EV drive, a torque from the second rotary machine 3 is transmitted by rotation of the output shaft system, for example, so as to allow the notch plate 72 to rotate; thus an internal negative pressure is generated inside the SOWC 7 due to difference in rotation between the notch plate 72 and the pocket plate 71. Accordingly, by utilizing this internal negative pressure, it is possible to introduce the lubricating oil O from the lubricating oil reservoir 92 through the oil passage 94 into the SOWC 7. Hence, according to the power transmission apparatus of the present embodiment, even during the EV drive with the oil pump 6 stopped, it is possible to supply a sufficient amount of the lubricating oil O to the SOWC 7.

[Second embodiment]Hereinafter, a power transmission apparatus according to a second embodiment will be described. The power transmission apparatus according to the present embodiment is different from the first embodiment in formation positions of the lubricating oil reservoir 92 and the oil passage 94, and the other configurations are the same as those of the first embodiment. In the following description, the shape of the through-hole 73a and the sectional shape of the oil passage 94 will be described based on the assumption of the aforementioned Embodiment Example 1 (see FIG. 3A to FIG. 4B), but Embodiment Examples 2, 3 may also be applicable.

As shown in FIG. 10, in the power transmission apparatus according to the present embodiment, the notch plate 72, the selector plate 73, a pocket plate 71C, and a center support 91C are adjacently arranged in this order from one side to the other side in the axial direction of the input shaft 11b. A lubricating oil reservoir 92C is disposed in the lubrication passage of the lubricating oil O in the rear case 8, and also on the pocket plate 71C opposite to the selector plate 73.

The "lubrication passage of the lubricating oil O" including the lubricating oil reservoir 92C denotes a passage where the lubricating oil O flows in the order from the rotor shaft 21, the bearing member 95 to the center support 91C, as with the first embodiment. "On the pocket plate 71C opposite to the selector plate 73" denotes the other side thereof in the axial direction of the input shaft 11b, as shown in FIG. 10.

As shown in FIG. 10, the lubricating oil reservoir 92C is configured to be provided at the downstream of the lubrication passage of the lubricating oil O, that is, radially outward so as to receive the lubricating oil O flowing radially outward by centrifugal force. The lubricating oil reservoir 92C is provided at a position close to the SOWC 7C both in the axial direction and in the radial direction of the input shaft 11b.

As shown in FIG. 10, the lubricating oil reservoir 92C is a region (space) partitioned by a region in the pocket plate 71C and a region in the center support 91C that face each other. More specifically, as shown in FIG. 10, the pocket plate 71C and the center support 91C are adjacently disposed in one partial region of the pocket plate 71C and the center support 91C in the axial direction of the input shaft 11b, and other partial regions thereof are so disposed as to face each other with a predetermined distance therebetween. Specifically, the pocket plate 71C and the center support 91C are adjacently disposed in their regions (radially outward regions) that are fastened together with a fastening member 96.

On the other hand, the pocket plate 71C and the center support 91C are so disposed as to face each other with a predetermined space therebetween in the axial direction of the input shaft 11b in their regions radially inward of their regions fastened together with the fastening member 96. The space formed by the pocket plate 71C and the center support 91C is set to be the lubricating oil reservoir 92C.

In this manner, the power transmission apparatus is capable of reserving the lubricating oil O flowing through the inside of the rear case 8 with a simple structure without using any additional member. Reservation amount of the lubricating oil O reserved in the lubricating oil reservoir 92C can be adjusted by changing the dimension of the space formed by the pocket plate 71C and the center support 91C.

As shown in FIG. 10, an oil passage 94 is formed between the lubricating oil reservoir 92C and the SOWC 7C. The oil passage 94 is so formed as to extend through the pocket plate 71C arranged between the lubricating oil reservoir 92C and the notch plate 72. The oil passage 94 is formed in this manner, thereby enabling the lubricating oil O reserved in the lubricating oil reservoir 92C to be supplied into the SOWC 7C, more specifically, between the pocket plate 71C and the selector plate 73, and between the selector plate 73 and the notch plate 72. The oil passage 94 is formed in a circular shape having a predetermined diameter at a predetermined position in the pocket plate 71C in FIG. 10.

As shown in FIG. 10, in the power transmission apparatus according to the present embodiment, the oil passage 94 is not formed to extend parallel with the axial direction of the input shaft 11b, but formed to be inclined relative to the radial direction of the input shaft 11b, as is different from the aforementioned first embodiment (see FIG. 2). Specifically, the oil passage 94 includes a first opening 94a opening toward the notch plate 72 side, and a second opening 94b opening toward the lubricating oil reservoir 92C side, and the second opening 94b is formed more radially outward than the first opening 94a.

Inside the SOWC 7C, the lubricating oil O flows from radially inward to radially outward; therefore, it is preferable to supply the lubricating oil O as radially inward as possible of the SOWC 7C. This means that it is preferable to provide the first opening 94a of the oil passage 94 as radially inward as possible of the SOWC 7C. However, if the oil passage 94 is formed to be parallel, it is necessary to reserve the lubricating oil O at a higher position of the lubricating oil reservoir 92C.

To the contrary, in the power transmission apparatus according to the present embodiment, the oil passage 94 is so formed as to have a difference in height relative to an oil surface of the lubricating oil O of the lubricating oil reservoir 92C, thereby forming the oil passage 94 to be inclined. Accordingly, even if the amount of the lubricating oil O reserved in the lubricating oil reservoir 92C is smaller, it is possible to efficiently supply the lubricating oil O radially inward of the SOWC 7C, thus promoting enhancement of the lubrication efficiency relative to the SOWC 7C.

If the oil surface of the lubricating oil O of the lubricating oil reservoir 92C is higher, the oil pump drive gear 62 as shown in FIG. 10 is soaked in the lubricating oil O, which might cause increase in agitation loss and deterioration of fuel efficiency. To the contrary, in the power transmission apparatus according to the present embodiment, the oil passage 94 is formed to have a difference in height relative to the oil surface so as to adjust the oil surface of the lubricating oil O in the lubricating oil reservoir 92C to be lower, thereby preventing increase in agitation loss and deterioration of fuel efficiency. It should be noted that during the EV drive, while the pump body 61 is stopped, a torque is transmitted from the second rotary machine 3 by the rotation of the output shaft system, for example, so that the oil pump drive gear 62 is rotated, which causes the aforementioned agitation loss.

[Third embodiment]Hereinafter, a power transmission apparatus according to a third embodiment will be described. The power transmission apparatus according to the present embodiment is different from the first embodiment in formation positions of the lubricating oil reservoir 92 and the oil passage 94, and the other configurations are the same as those of the first embodiment. In the following description, the shape of the through-hole 73a and the sectional shape of the oil passage 94 will be described based on the assumption of the aforementioned Embodiment Example 1 (see FIG. 3A to FIG. 4B), but Embodiment Examples 2, 3 may also be applicable.

As shown in FIG. 11, in the power transmission apparatus according to the present embodiment, a center support 91D, the notch plate 72, the selector plate 73, and a pocket plate 71D are adjacently arranged in this order from the other side to one side in the axial direction of the input shaft 11b. Specifically, the power transmission apparatus according to the present embodiment has a reverse arrangement of the pocket plate 71D and the notch plate 72 in the axial direction of the input shaft 11b to the arrangement thereof in the first embodiment (see FIG. 2). A lubricating oil reservoir 92D is disposed in the lubrication passage of the lubricating oil O in the rear case 8, and also on the pocket plate 71D opposite to the selector plate 73.

The "lubrication passage of the lubricating oil O" including the lubricating oil reservoir 92D denotes a passage where the lubricating oil O flows from the input shaft 11b, the sun gear 51, the pinion gear 52, and a ring gear 53D in this order, or a passage where the lubricating oil O flows from the input shaft 11b, the carrier 54, and the ring gear 53D in this order. In the present embodiment, as shown in FIG. 11, an oil passage 53Db is formed in the ring gear 53D so as to introduce the lubricating oil O flowing through the lubrication passage into the lubricating oil reservoir 92D. The lubricating oil O flowing through the lubrication passage flows in the aforementioned lubrication passage radially outward by centrifugal force, and is reserved in the lubricating oil reservoir 92D through the oil passage 53Db of the ring gear 53D.

The lubricating oil reservoir 92D is configured to be provided at the downstream of the lubrication passage of the lubricating oil O, that is, radially outward, as shown in FIG. 11, so as to receive the lubricating oil O flowing radially outward by centrifugal force. The lubricating oil reservoir 92D is provided at a position close to the SOWC 7D both in the axial direction and in the radial direction of the input shaft 11b.

As shown in FIG. 11, the lubricating oil reservoir 92D is a region (space) partitioned by a surface of the pocket plate 71D on an opposite side to the notch plate 72 and a shielding member 93D facing this surface. More specifically, to the surface of the pocket plate 71D on the opposite side to the notch plate 72, there is fixed the shielding member 93D in a platy shape including a bent portion 93Da that closes a radially outward side of the shielding member 93D, and opens a radially inward side thereof. The space formed by the shielding member 93D and the surface of the pocket plate 71D on the opposite side to the notch plate 72 is set to be the lubricating oil reservoir 92D.

In this manner, the power transmission apparatus is capable of reserving the lubricating oil O flowing through the inside of the rear case 8 with a simple structure. To be specific, amount of reservation of the lubricating oil O reserved in the lubricating oil reservoir 92D can be adjusted by changing the position of the bent portion 93Da of the shielding member 93D.

As shown in FIG. 11, an oil passage 94 is formed between the lubricating oil reservoir 92D and the SOWC 7D. The oil passage 94 is so formed as to extend through the pocket plate 71D arranged between the lubricating oil reservoir 92D and the notch plate 72. The oil passage 94 is formed in this manner, thereby enabling the lubricating oil O reserved in the lubricating oil reservoir 92D to be supplied into the SOWC 7D, more specifically, between the pocket plate 71D and the selector plate 73, and between the selector plate 73 and the notch plate 72. The oil passage 94 is formed in a circular shape having a predetermined diameter at a predetermined position in the pocket plate 71D in FIG. 11.

If the SOWC 7D is disposed on an outer periphery of the planetary gear mechanism 5D, the notch plate 72 is slidingly assembled to the ring gear 53D from the other side to one side in the axial direction of the input shaft 11b; but for example, with respect to the SOWC 7 of the first embodiment and the SOWC 7C of the second embodiment, as shown in FIG. 2 and FIG. 10, the notch plate 72 is disposed on one side in the axial direction of the input shaft 11b relative to the pocket plate 71, 71C, so that the spline 53a formed on the outer periphery of the ring gear 53 becomes longer, which requires a longer time for the assembly.

To the contrary, with respect to the SOWC 7D according to the present third embodiment, as shown in FIG. 11, the notch plate 72 is disposed on the other side in the axial direction of the input shaft 11b relative to the pocket plates 71D, and thus the spline 53Da formed on the outer periphery of the ring gear 53D becomes shorter than the SOWC 7 and the SOWC 7C according to the first and the second embodiments, thus enhancing assemblability.

With respect to the power transmission apparatus according to the present embodiment, since the oil pump drive gear 62 is located apart from the lubricating oil reservoir 92D, there is no concern about, e.g., increase in agitation loss due to soaking of the oil pump drive gear 62 in the lubricating oil O, as described in the second embodiment.

As aforementioned, a power transmission apparatus according to embodiments of the present invention is not intended to be limited to the embodiments described above, and shall be construed broadly based on the description of the scope of the claims. Moreover, various changes and modifications that are made based on these descriptions may be included in embodiments of the present invention.

What is claimed is:

1. A power transmission apparatus for a vehicle, the vehicle including an engine and a motor as driving power sources, the vehicle configured to be able to travel using only the motor as the driving power source with the engine stopped, the power transmission apparatus comprising:
    an input shaft into which power from the engine is inputted;
    a selectable one-way clutch including a notch plate, a selector plate, and a pocket plate, the notch plate, the selector plate, and the pocket plate arranged around the input shaft, the notch plate, the selector plate, and the pocket plate adjacently arranged in an axial direction of the input shaft in an order from the notch plate, the selector plate, and the pocket plate, the selectable one-way clutch configured such that switching between an engagement state of transmitting a torque between the pocket plate and the notch plate and a non-engagement state of transmitting no torque between the pocket plate and the notch plate is carried out by rotation of the selector plate, the selectable one-way clutch configured to rotate the notch plate along with rotation of the motor;
    a housing case configured to house the input shaft and the selectable one-way clutch inside the housing case;
    a center support disposed between an inner surface of the housing case and the input shaft inside the housing case, the center support configured to support the input shaft relative to the housing case;
    a lubricating oil reservoir disposed in a lubrication passage of the lubricating oil inside the housing case; and
    an oil passage configured to supply the lubricating oil reserved in the lubricating oil reservoir into the selectable one-way clutch, the oil passage extending through the pocket plate disposed between the lubricating oil reservoir and the selector plate, wherein:
    the selector plate includes a through-hole located at a position where the through-hole is not lined up with an opening of the oil passage in a radial direction and a circumferential direction of the selector plate in the non-engagement state of the selectable one-way clutch, and also at a position where the through-hole is lined up with the opening of the oil passage in the radial direction and the circumferential direction of the selector plate in the engagement state of the selectable one-way clutch;
    the selector plate is a circular plate and the through-hole is located on the circular plate; and
    the through-hole is one of:
        a laterally long elliptical shape of which shorter sides are arranged in the radial direction of the selector plate; and
        a rectangular shape of which longer sides are arranged in the radial direction of the selector plate.

2. The power transmission apparatus according to claim 1, wherein a portion of the pocket plate is disposed between the lubricating oil reservoir and the selector plate in the axial direction of the input shaft.

3. The power transmission apparatus according to claim 1, wherein
    the notch plate, the selector plate, the pocket plate, and the center support are adjacently arranged in the axial direction of the input shaft in an order from the notch plate, the selector plate, the pocket plate, and the center support,
    a portion of the center support is disposed between the lubricating oil reservoir and the pocket plate in the axial direction of the input shaft, and
    the oil passage extends through the pocket plate and the center support disposed between the lubricating oil reservoir and the selector plate.

4. The power transmission apparatus according to claim 1, wherein
    the through-hole is located at an outer peripheral position of the selector plate,
    the oil passage is located at a position corresponding to the through-hole in the radial direction of the selector plate, and
    a sectional shape of the oil passage is the same as a shape of the through-hole, and is a laterally long elliptical shape of which shorter sides are arranged in the radial direction of the selector plate.

5. The power transmission apparatus according to claim 1, wherein a sectional shape of the oil passage is the same as a shape of the through-hole, and is a rectangular shape of which longer sides are arranged in the radial direction of the selector plate.

* * * * *